United States Patent [19]

Flood

[11] Patent Number: 5,461,817
[45] Date of Patent: Oct. 31, 1995

[54] FISHING ROD JIGGING APPARATUS

[76] Inventor: Glenn A. Flood, Box 1131, Gaylord, Mich. 49735

[21] Appl. No.: 181,793

[22] Filed: Jan. 18, 1994

[51] Int. Cl.$^6$ .................................................. A01K 97/10
[52] U.S. Cl. ............................................................ 43/19.2
[58] Field of Search .................................. 43/19.2, 26.1, 43/21.2

[56] References Cited

U.S. PATENT DOCUMENTS

| | | | |
|---|---|---|---|
| 3,665,633 | 5/1972 | Scott | 43/19.2 |
| 3,839,810 | 10/1979 | Lagasse | 43/19.2 |
| 3,975,854 | 8/1976 | Graham | 43/19.2 |
| 4,660,317 | 4/1987 | Evans | 43/19.2 |
| 4,901,469 | 2/1990 | Murray | 43/21.2 |
| 4,916,847 | 4/1990 | Ruszo | 43/19.2 |
| 5,056,255 | 10/1991 | Campbell | 43/19.2 |

Primary Examiner—Kurt Rowan

[57] ABSTRACT

An apparatus for supporting and jigging fishing lines comprising a jigging mechanism having an elongated jigging bar positioned in an essentially linear configuration and having free ends, bearing structures to support the free ends, an oscillating means for reciprocating the jigging bar about its axis, and a plurality of rod holders coupled to the jigging bar, each adapted to hold a fishing rod therein; a supporting mechanism coupled to the bearing structures and adapted to be coupled to a boat for holding the jigging rod at a distance offset therefrom; a motor for providing power to the oscillating means; a power delivery mechanism for providing power to the motor; a switch mechanism coupled between the motor and power delivery means for activating and inactivating the motor at the discretion of an operator; and an oscillating mechanism coupled between the motor and the jigging bar for effecting a rocking motion to the jigging bar to jig fishing rods placed in the rod holders.

1 Claim, 3 Drawing Sheets

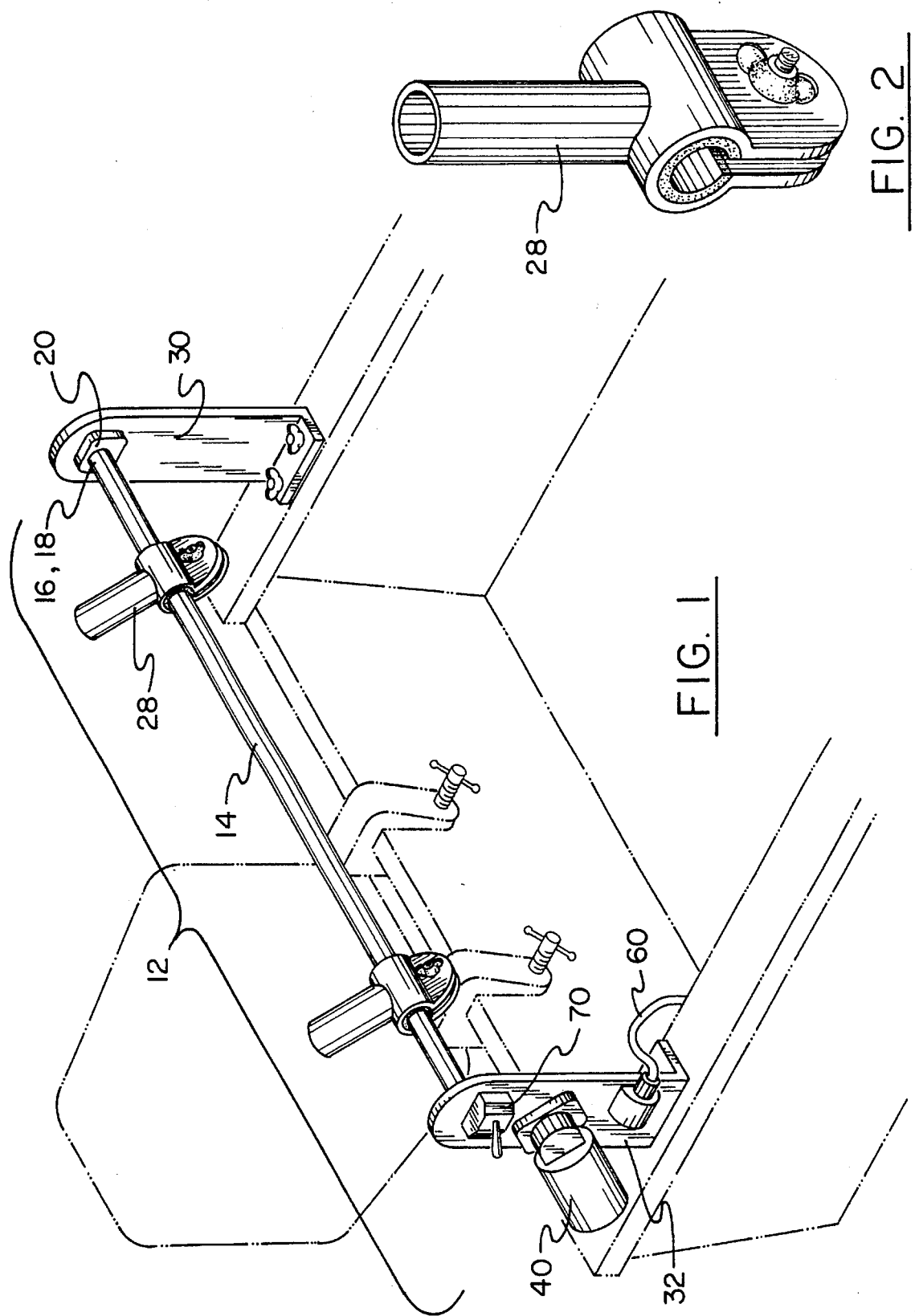

FISHING ROD JIGGING APPARATUS

BACKGROUND OF THE INVENTION

1. Field of the Invention

The present invention relates to a fishing rod jigging apparatus and more particularly pertains a fishing rod jigging apparatus for supporting and automatically jigging fishing rods.

2. Description of the Prior Art

The use of fishing devices is known in the prior art. More specifically, fishing devices heretofore devised and utilized for the purpose of supporting and jigging fishing rods are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. Nos. 5,056,255 to Campbell, 5,084,995 to Beaudoin, 5,119,580 to Schulte, 5,086,580 to Redding, 3,691,668 to Strebig, and 4,100,695 to Blanchard disclose fishing rod jigging apparatuses.

While these devices fulfill their respective, particular objective and requirements, the aforementioned patents do not describe a fishing rod jigging apparatus that is positionable at the stern of a boat for jigging while simultaneously holding a free end of a fishing line and bait at a predetermined distance beneath the surface of the water for trolling as a function of the extent of the downrigger wire reeled out from the spool.

In this respect, the fishing rod jigging apparatus according to the present invention substantially departs from the conventional concepts and designs of the prior art, and in doing so provides an apparatus primarily developed for the purpose of supporting and automatically jigging fishing rods.

Therefore, it can be appreciated that there exists a continuing need for new and improved fishing rod jigging apparatus which can be used for supporting and automatically jigging fishing rods. In this regard, the present invention substantially fulfills this need.

SUMMARY OF THE INVENTION

In the view of the foregoing disadvantages inherent in the known types of fishing devices now present in the prior art, the present invention provides an improved fishing rod jigging apparatus. As such, the general purpose of the present invention, which will be described subsequently in greater detail, is to provide a new and improved fishing rod jigging apparatus and method which has all the advantages of the prior art and none of the disadvantages.

To attain this, the present invention essentially comprises a jigging mechanism having an elongated jigging bar positioned in a linear configuration and having free ends, bearing structures positioned adjacent to the stern of a boat to support the free ends, an oscillating plate having a first aperture secured with respect to one free end of the jigging bar and a second aperture remote therefrom for reciprocating the jigging bar in a curved fashion about the axis of the first aperture, and a plurality of rod holders removably coupled to the jigging bar, each adapted to hold a fishing rod therein; a pair of vertical support braces having an upper extent and a lower extent, each brace coupled to a bearing structure near the upper extent thereof with the lower extent adapted to be coupled to the stern of a boat, a motor secured to one of the support braces with an integral output shaft rotatably disposed therethrough for providing rotational power to the output shaft; a cam mounted for rotation with the output shaft of the motor, the cam having a cam shaft offset from the axis of rotation of the output shaft; operator-controlled power delivery means adapted to be coupled to a battery on a boat for providing power to the motor; switch means coupled between the motor and power delivery means for activating and inactivating the motor at the discretion of an operator; a J-shaped bracket having a long linear extent terminating in a power input end, a curved section terminating at a power output end, an intermediate aperture constituting a pivot point, the pivot point being pivotally coupled to the vertical support bracket, an aperture in the linear extent of the J-shaped bracket with coupling means extending therefrom for coupling with the cam shaft for effecting a rocking motion of the J-shaped bracket about the pivot point, and a third aperture adjacent to the power output end of the curved section with pivoting means pivotally coupling the third aperture to the second aperture of the oscillating plate, whereby rotation of the cam will oscillate the J-shaped bracket as well as the oscillating plate and provide axial rotation of the jigging bar to jig fishing rods placed in the rod holders; a spool of downrigger wire secured positionable with respect to the stern of the boat and mounted with respect to a vertical brace; operator-controlled drive means for reeling out and reeling in downrigger wire from the spool; a weight adapted to be coupled to the free end of the downrigger wire for extending downwardly from the stern of the boat; and a release secured to the wire adjacent to the weight for allowing the passage of fishing line therethrough from a rod supported in a rod holder such that the free end of the fishing line and bait coupled thereto are positioned at a predetermined distance beneath the surface of the water for trolling as a function of the extent of the downrigger wire reeled out from the spool.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod jigging apparatus which has all the advantages of the prior art fishing devices and none of the disadvantages.

It is another object of the present invention to provide a new and improved fishing rod jigging apparatus which may be easily and efficiently manufactured and marketed.

It is a further object of the present invention to provide a new and improved fishing rod jigging apparatus which is of durable and reliable construction.

An even further object of the present invention is to provide a new and improved fishing rod jigging apparatus which is susceptible of a low cost of manufacture with regard to both materials and labor, and which accordingly is then susceptible of low prices of sale to the consuming public, thereby making such a fishing rod jigging apparatus economically available to the buying public.

Still yet another object of the present invention is to provide a new and improved fishing rod jigging apparatus which provides in the apparatuses and methods of the prior art some of the advantages thereof, while simultaneously overcoming some of the disadvantages normally associated therewith.

Even still another object of the present invention is to provide a new and improved fishing rod jigging apparatus for supporting and automatically jigging fishing rods.

Even still another object of the present invention is to provide a new and improved fishing rod jigging apparatus that is positionable at the stern or the side of a boat for jigging while simultaneously holding a free end of a fishing line and bait at a predetermined distance beneath the surface of the water for trolling as a function of the extent of the fishing line.

Even still another object of the present invention is to provide a new and improved fishing rod jigging apparatus that may be used on a boat or used portably, for example, when ice fishing.

Even still another object of the present invention is to provide a new and improved fishing rod jigging apparatus that may be jigged at different speeds.

Even still another object of the present invention is to provide a new and improved fishing rod jigging apparatus whose height and width is adjustable in order to be secured to a variety of boats.

Even still another object of the present invention is to provide a new and improved fishing rod jigging apparatus that may be used for bottom fishing or trolling.

Lastly, it is an object of the present invention is to provide a new and improved fishing rod jigging apparatus comprising a jigging mechanism having an elongated jigging bar positioned in an essentially linear configuration and having free ends, bearing structures to support the free ends, an oscillating means for reciprocating the jigging bar about its axis, and a plurality of rod holders coupled to the jigging bar, each adapted to hold a fishing rod therein; supporting means coupled to the bearing structures and adapted to be coupled to a boat for holding the jigging at a distance offset therefrom, the supporting means having a motor secured thereto; power delivery means for providing power to the motor; switch means coupled between the motor and power delivery means for activating and inactivating the motor at the discretion of an operator; oscillating means coupled between the motor and the jigging bar for effecting a rocking motion to the jigging bar to jig fishing rods placed in the rod holders.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the fishing rod jigging apparatus constructed in accordance with the principles of the present invention.

FIG. 2 is an enlarged perspective view of one of the rod holders.

The same reference numerals refer to the same parts through the various Figures.

DESCRIPTION OF THE PREFERRED EMBODIMENT

Figure 3:
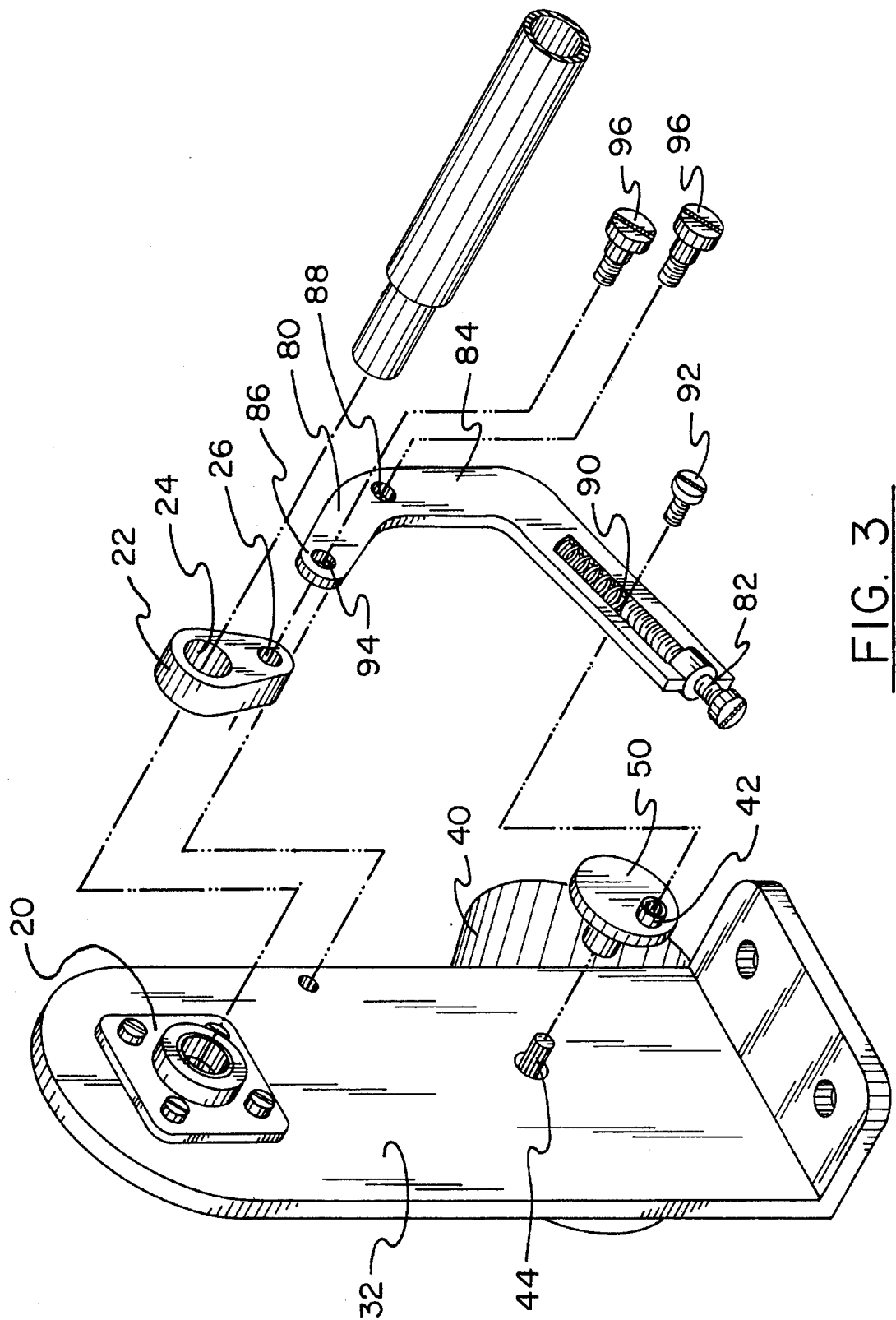
FIG. 3 is an exploded perspective showing of the motion imparting mechanisms of FIG. 1.
Figure 4:
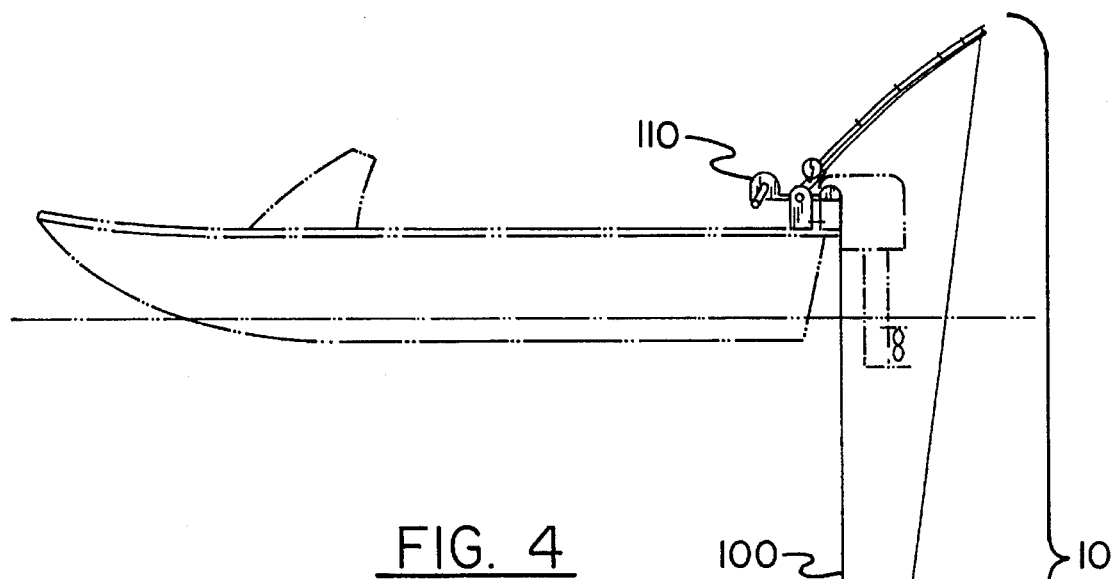
FIG. 4 is a side elevational view of an alternate embodiment of the invention.
Figure 5:
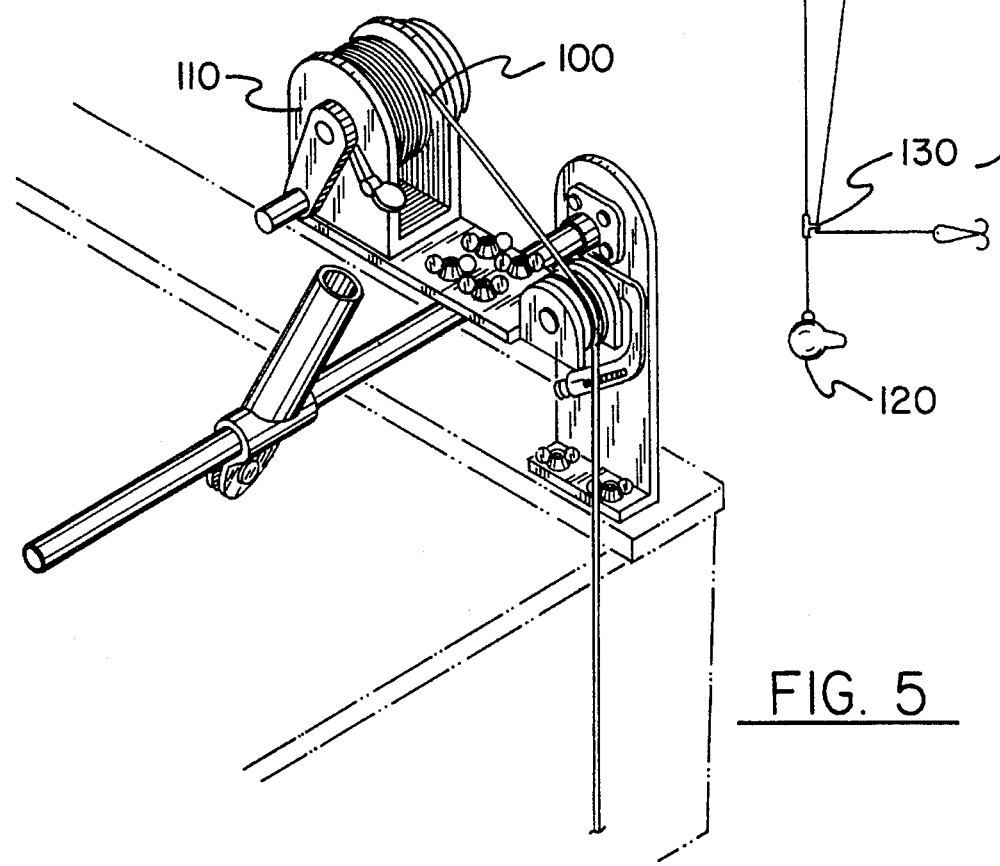
FIG. 5 is an enlarged perspective depicting the invention being used for trolling.

With reference now to the drawings, and in particular, to FIG. 1 thereof, the preferred embodiment of the new and improved fishing rod jigging apparatus embodying the principles and concepts of the present invention and generally designated by the reference number 10 will be described.

Specifically, the present invention includes 11 major components. The 11 major components are a jigging mechanism, a pair of vertical support braces, a motor, a cam, an operator controlled power delivery means, a switch means a J shaped bracket, a spool of downrigger wire, an operator controlled drive means, a weight, and a release. These components are interrelated to provide the intended function.

More specifically, it will be noted in the various Figures that the first major is the jigging mechanism 12. The jigging mechaism includes an elongated jigging bar 14. The elongated jigging bar is positioned in a linear configuration with respect to the stern of a boat. The jigging bar has two free ends 16, 18. The jigging mechanism includes bearing structures 20 positioned adjacent to the stern of a boat to support the free ends. The jigging mechanism also includes an oscillating plate 22 having a first aperture 24 secured with respect to one free end of the jigging bar. The oscillating plate also includes a second aperture 26 remote therefrom for reciprocating the jigging bar in a curved fashion about the axis of the first aperture. The jigging bar also includes a plurality of rod holders 28 removably coupled to the jigging bar. Each rod holder is adapted to hold a fishing rod therein. The rod holder also acts as the fulcrum of a lever to assist a fisherman in pulling in fish that are hooked.

The second major component is the support braces 30, 32. The pair of vertical support braces have an upper extent and a lower extent. Each support brace is coupled to a bearing structure 20 positioned near the upper extent thereof. The lower extent of each support brace is adapted to be coupled to the stern or side of a boat or any other generally level surface, like a frozen lake.

The third major component is a motor 40. The motor is secured to one of the support braces 32. The motor has an integral output shaft 44 rotatably disposed therethrough. The motor provides rotational power to rotate the output shaft.

The fourth major component is a cam 50. The cam is mounted for rotation with the output shaft 34 of the motor. The cam has a cam shaft 42 offset from the axis of rotation of the output shaft.

The fifth major component is the operator controlled power delivery means 60. The power delivery means 60 is adapted to be coupled to a battery on a boat or a general-purpose power supply. The power delivery means is adapted to provide power to the motor.

The sixth major component is the switch means 70. The switch means is coupled between the motor 40 and the power delivery means 60. The switch is used to activate and inactivate the motor at the discretion of an operator.

The seventh major component is the J-shaped bracket 80. The J-shaped bracket has a long linear extent terminating in a power input end 82. The J-shaped bracket also has a curved section 84 terminating at a power output end 86. It also has an intermediate aperture constituting a pivot point 88. The pivot point is pivotally coupled to a vertical support brace 32. The J-shaped bracket also includes a positionable aperture 90 in the linear extent of the J-shaped bracket. Coupling means 92 are disposed through the positionable aperature for coupling with the cam shaft 52 for effecting a rocking motion of the J-shaped bracket about the pivot point. The J-shaped bracket also includes a third aperture 94 adjacent to the power output end of the curved section. Pivoting means 96 pivotally couple the third aperture to the second aperture of the oscillating plate. Rotation of the cam oscillates the J-shaped bracket as well as the oscillating plate. Rotation of the cam also provides axial rotation of the jigging bar 14 to jig fishing rods placed in the rod holders 28.

The eighth major component is the spool of downrigger wire 100. The spool of downrigger wire is secured positionable with respect to the rear of a boat. The downrigger wire has a free end for placing a weight thereon to.

The ninth major component is the operator-controlled drive means 110. The drive means is secured positionable with respect to the stern of a boat. The drive means is used for reeling out and reeling in downrigger wire from the spool.

The tenth major component is the weight 120. The weight is adapted to be coupled to the free end of a downrigger wire extended from the drive means. The weight is used to hold an intermediate portion of the line at a location beneath the stern of a boat.

The eleventh major component is the release 130 coupled to the fishing line between the free end and a fishing rod. The release is secured to the wire adjacent to the weight. The release is adapted to allow the passage of fishing line therethrough from a fishing rod supported in a rod holder. The release holds the free end of the fishing line and bait coupled thereto at a predetermined distance beneath the surface of the water for trolling as a function of the extent of the downrigger wire reeled out from the spool.

In the preferred embodiment of the invention the fishing rod jigging apparatus may be mounted across the rear of a boat, mounted to the side of a boat, or positioned in a freestanding configuration for jigging. The jigging bar is a galvanized pipe having a diameter of 1 inch. The jigging has an extendable length. A longer bar allows more fishing rod holders to utilized. The apparatus may be used for trolling, bottom fishing, or ice fishing. When used for ice fishing, the apparatus can be mounted to a board that is positioned across the ice. The height of the fishing rod jigging apparatus is adjustable such that a fishing rod placed theron can be extended upwards. The speed of the motor is also be adjustable for effecting various jigging speeds to the fishing pole and fishing line. The motor also has a park position and intermittent speeds such that one can activate, inactivate, and control the speed and time between jigging cycles. An intermittent automobile windshield wiper motor can be utilized. The apparatus is adapted to run on 12 volts DC. Any automotive or marine type battery that can be used in a car or boat can be used to provide power to the apparatus. The cam on the apparatus can be configured such that three adjustments may be made to the jigging position thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved apparatus for supporting and jigging fishing lines comprising, in combination:

a jigging mechanism having an elongated jigging bar positioned in a linear configuration and having free ends, bearing structures positioned adjacent to the stern of a boat to support the free ends, an oscillating plate having a first aperture secured with respect to one free end of the jigging bar and a second aperture remote therefrom for reciprocating the jigging bar in a curved fashion about the axis of the first aperture, and a plurality of rod holders removably coupled to the jigging bar, each adapted to hold a fishing rod therein;

a pair of vertical support braces having an upper extent and a lower extent, each brace coupled to a bearing structure near the upper extent thereof with the lower extent adapted to be coupled to the stern of a boat, a motor secured to one of the support braces with an output shaft rotatably disposed therethrough for providing rotational power to the output shaft;

a cam mounted for rotation with the output shaft of the motor, the cam having a cam shaft offset from the axis of rotation of the output shaft;

operator-controlled power delivery means adapted to be coupled to a battery on a boat for providing power to the motor;

switch means coupled between the motor and power delivery means for activating and inactivating the motor at the discretion of an operator;

a J-shaped bracket having a long linear extent terminating in a power input end, a curved section terminating at a power output end, an intermediate aperture constituting a pivot point, the pivot point being pivotally coupled to the vertical support bracket, an aperture in the linear extent of the J-shaped bracket with coupling means extending therefrom for coupling with the cam shaft for effecting a rocking motion of the J-shaped bracket about the pivot point, and a third aperture adjacent to the power output end of the curved section with pivoting means pivotally coupling the third aperture to the second aperture of the oscillating plate, whereby rotation of the cam will oscillate the J-shaped bracket as well as the oscillating plate and provide axial rotation of the jigging bar to jig fishing rods placed in the rod holders;

a spool of downrigger wire secured positionable with respect to the rear of the boat and mounted with respect to a vertical brace;

operator-controlled drive means for reeling out and reeling in downrigger wire from the spool;

a weight adapted to be coupled to the free end of the fishing line for extending downwardly from the rear of the boat; and a release secured to the wire adjacent to the weight for allowing the passage of fishing line therethrough from a rod supported in a rod holder such that the free end of the fishing line and bait coupled thereto are positioned at a predetermined distance beneath the surface of the water for trolling as a function of the extent of the downrigger wire reeled out from the spool.

* * * * *